US009713861B2

(12) United States Patent
Luo et al.

(10) Patent No.: US 9,713,861 B2
(45) Date of Patent: Jul. 25, 2017

(54) MANUFACTURING SYSTEM AND METHOD FOR FABRICATING A COMPONENT

(71) Applicant: GENERAL ELECTRIC COMPANY, Schenectady, NY (US)

(72) Inventors: Yuefeng Luo, Mechanicville, NY (US); William Edward Adis, Scotia, NY (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 14/500,177

(22) Filed: Sep. 29, 2014

(65) Prior Publication Data

US 2016/0089754 A1  Mar. 31, 2016

(51) Int. Cl.
*B23P 15/04* (2006.01)
*F01D 5/14* (2006.01)
(Continued)

(52) U.S. Cl.
CPC ............ *B23P 15/04* (2013.01); *B21F 23/00* (2013.01); *B21F 45/00* (2013.01); *B23K 10/02* (2013.01);
(Continued)

(58) Field of Classification Search
CPC ............ B23P 15/04; B23K 2201/001; B23K 2201/32; B23K 2203/14; B23K 2203/04; B23K 2203/26; B23K 10/02; B23K 15/006; B23K 26/342; B23K 26/24; B23K 15/0086; B23K 15/0006; B21F 23/00; B21F 45/00; F01D 5/147; F05D 2230/234; F05D 2230/233
See application file for complete search history.

(56) References Cited

U.S. PATENT DOCUMENTS

| 9,364,887 B2 * | 6/2016 | Godon | ............... B21D 22/022 |
| 2014/0068937 A1 * | 3/2014 | Godon | ................... C22C 14/00 |
| | | | 29/889 |

(Continued)

OTHER PUBLICATIONS

Colegrove, P. High deposition rate high quality metal additive manufacture using wire+ arc technology. Cranfield University. www.cranfield.ac.uk.

*Primary Examiner* — Moshe Wilensky
(74) *Attorney, Agent, or Firm* — Ernest G. Cusick; Frank A. Landgraff

(57) ABSTRACT

Provided are a manufacturing system and a method for fabricating a component. The manufacturing system includes a wire delivery assembly arranged and disposed to deliver a wire feed to a fabrication assembly arrangement; the fabrication assembly arrangement includes a wire manipulation assembly, the wire manipulation assembly being arranged and disposed to convert the wire feed into a wire segment and position the wire segment on a workpiece positioner to form a workpiece stack; an energy beam source assembly arranged and disposed to direct one or more energy beams toward one or more aligned surfaces of adjacent wire segments within the workpiece stack, to weld the wire segments together. The method includes delivering a wire feed to a fabrication assembly; cutting and positioning a wire segment; and directing an energy beam toward one or more aligned surfaces of adjacent wire segments to weld the wire segments together.

20 Claims, 11 Drawing Sheets

(51) Int. Cl.
*B21F 23/00* (2006.01)
*B21F 45/00* (2006.01)
*B23K 15/00* (2006.01)
*B23K 10/02* (2006.01)
*B23K 26/24* (2014.01)
*B23K 26/342* (2014.01)
*B23K 101/00* (2006.01)
*B23K 101/32* (2006.01)
*B23K 103/04* (2006.01)
*B23K 103/14* (2006.01)
*B23K 103/18* (2006.01)

(52) U.S. Cl.
CPC ........ *B23K 10/027* (2013.01); *B23K 15/0006* (2013.01); *B23K 15/006* (2013.01); *B23K 15/0086* (2013.01); *B23K 26/24* (2013.01); *B23K 26/342* (2015.10); *F01D 5/147* (2013.01); *B23K 2201/001* (2013.01); *B23K 2201/32* (2013.01); *B23K 2203/04* (2013.01); *B23K 2203/14* (2013.01); *B23K 2203/26* (2015.10); *F05D 2230/233* (2013.01); *F05D 2230/234* (2013.01)

(56) References Cited

U.S. PATENT DOCUMENTS

2015/0209905 A1\* 7/2015 Matthews .............. B23K 26/32
219/76.14
2016/0144567 A1\* 5/2016 Muller .................... B29C 70/70
264/308

\* cited by examiner

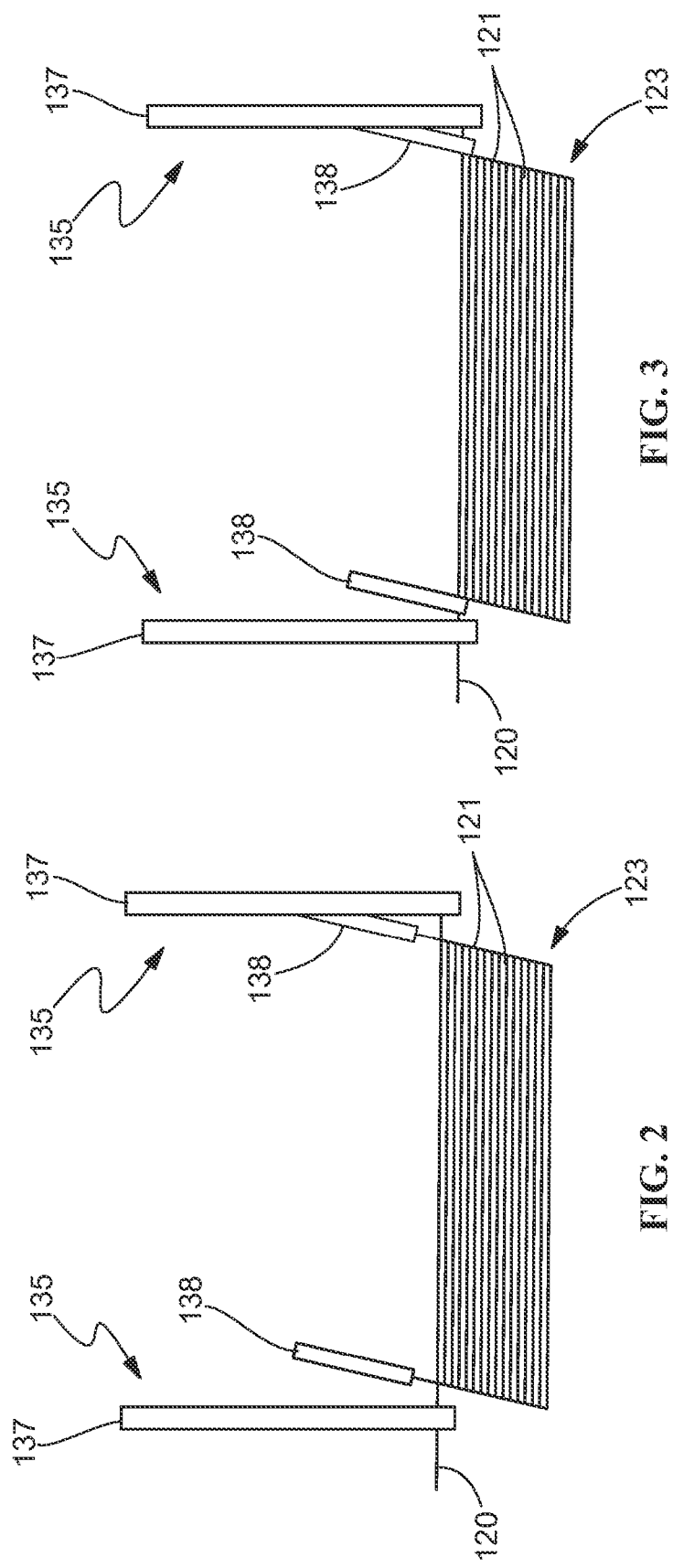

MANUFACTURING SYSTEM AND METHOD FOR FABRICATING A COMPONENT

FIELD OF THE INVENTION

The present invention is directed to a manufacturing system and a method for fabricating a component. More specifically, the invention is directed to an additive manufacturing system and a method for fabricating a component with an additive manufacturing system.

BACKGROUND OF THE INVENTION

Turbine engines typically include multiple stages, each stage including a plurality of buckets. The buckets often vary in size between the stages, with some buckets, such as the last stage buckets (LSB) in a steam turbine, having a length of about 40 inches. Recently, to increase steam turbine performance, there has been a desire to increase the length of the last stage buckets to 54 inches or more.

However, with the increasing size of the last stage buckets, prototype delivery presents a manufacturing challenge involving unprecedentedly large forging dies and processes exceeding current capability. Additionally, the increasing size can extend the manufacturing cycle up to several weeks per part, while changes or modifications after the investment is made can significantly increase costs. These cost increases can often be prohibitive to making such design changes or modifications. For at least these reasons, the last stage bucket is one of the most expensive and difficult components to produce in steam turbines.

One method of reducing prototyping costs includes additive manufacturing. However, current additive manufacturing methods are limited to relatively small components. For example, three-dimensional printing, which builds up the bulk of a component from metallic powders, would take a prohibitively long time to form a large workpiece such as a last stage bucket. Other methods, which rely on deposition of molten metal or filler, would similarly take a prohibitively long time to form a large workpiece. In addition, current additive methods often include systems with structural limitations which would prohibit the formation of large workpieces.

A system and a method that show one or more improvements in comparison to the prior art would be desirable in the art.

BRIEF DESCRIPTION OF THE INVENTION

In one embodiment, an additive manufacturing system includes a wire delivery assembly arranged and disposed to deliver a wire feed to a fabrication assembly arrangement; the fabrication assembly arrangement includes a wire manipulation assembly, the wire manipulation assembly being arranged and disposed to convert the wire feed into a wire segment and position the wire segment on a workpiece positioner to form a workpiece stack, the workpiece positioner being arranged and disposed to provide multiple axis motion to the workpiece stack during assembly; an energy beam source assembly arranged and disposed to direct one or more energy beams toward one or more aligned surfaces of adjacent wire segments within the workpiece stack, to weld the wire segments together.

In another embodiment, a method for fabricating a component includes delivering a wire feed to a fabrication assembly arrangement with a wire delivery assembly; cutting and positioning a wire segment on a workpiece positioner within the wire delivery assembly with a wire manipulation assembly, the workpiece positioner being arranged and disposed to provide multiple axis motion to the workpiece stack; directing an energy beam from an energy beam source assembly toward one or more aligned surfaces of adjacent wire segments within the workpiece stack to weld the wire segments together.

In another embodiment, a component includes a workpiece stack comprising a plurality of wire segments welded together along aligned adjacent surfaces.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 2 is a schematic view of a wire manipulation assembly including a high energy beam cutter, according to an embodiment of the disclosure.

FIG. 3 is a schematic view of a wire manipulation assembly including a mechanical cutter, according to an embodiment of the disclosure.

Wherever possible, the same reference numbers will be used throughout the drawings to represent the same parts.

DETAILED DESCRIPTION OF THE INVENTION

Provided are a system and a method for producing an article. Embodiments of the present disclosure, for example, in comparison to concepts failing to include one or more of the features disclosed herein, permit fabrication of larger articles with additive manufacturing, increase manufacturing rate, increase detailed manufacturing capability (e.g., the ability to make difficult details such as the mid-span), increase article strength, increase article toughness, increase fatigue resistance, decrease prototyping and/or development cycle time, decrease prototyping and/or development cost, decrease delivery time, decrease article tooling, decrease grain size, decrease coarse grain formation, decrease welding stress, decrease global stress, or a combination thereof.

Figure 1:
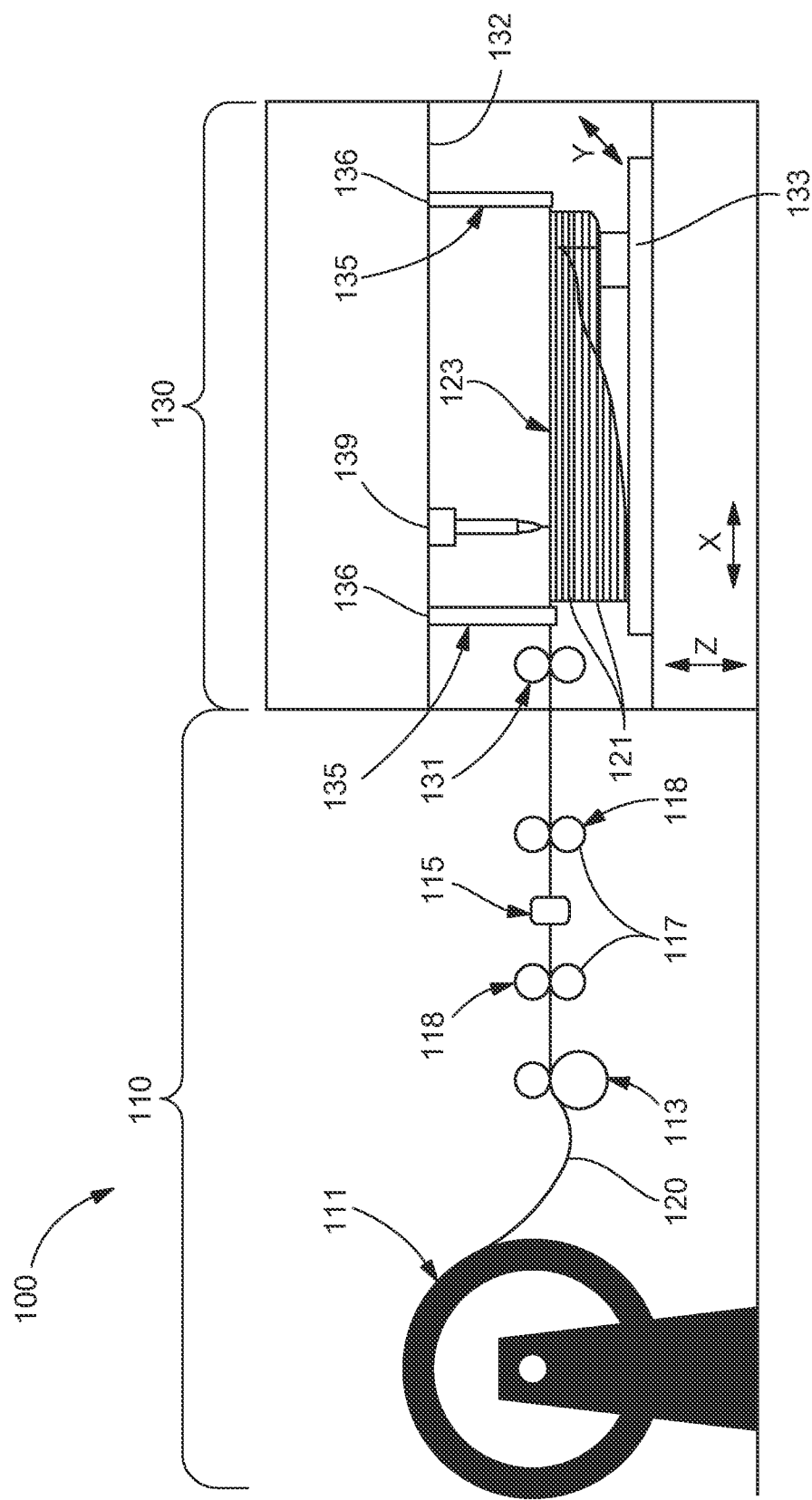
FIG. 1 is a perspective view of an additive manufacturing system, according to an embodiment of the disclosure.

Referring to FIG. 1, an additive manufacturing system 100 includes a wire delivery system 110 and a fabrication assembly arrangement 130, the fabrication assembly arrangement 130 including a workpiece positioner 133, a wire manipulation assembly 135, and an energy beam source assembly 139. In one embodiment, the wire manipulation assembly 135 and/or the energy beam source assembly 139 are coupled to a scaffold 132. The wire delivery system 110 is arranged and disposed to deliver a wire feed 120 to the fabrication assembly arrangement 130. The wire manipulation assembly 135 is arranged and disposed to then convert the wire feed 120 into one or more wire segments 121, and position the one or more wire segments 121 on the workpiece positioner 133 to form a workpiece stack 123. The wire feed 120, and the wire segments 121 formed therefrom, include any material which is capable of being fused and/or welded, such as, but not limited to, metals, alloys, metallic materials and polymers. For example, suitable wire materials include weldable steels, titanium alloys, nickel or cobalt superalloys, other weldable nonferrous alloys, polymers, or a combination thereof.

In one embodiment, the wire delivery system 110 includes a reel 111, a pickup and brake roller 113, and a wire end sensor 115. The wire feed 120 extends from the reel 111, through the pickup and brake roller 113, and into a delivery roller 131 in the fabrication assembly arrangement 130. In another embodiment, the wire delivery system 110 includes an orientation device 117 arranged and disposed to align one or more surfaces of a wire segment 121 in a predetermined direction. The orientation device 117 includes any suitable mechanism for aligning the wire segment 121, such as, but not limited to, one or more straightening rollers 118. In a further embodiment, the straightening roller 118 includes grooves and/or features that are similar or substantially similar to a cross-sectional geometry of the wire feed 120, the grooves and/or features straightening or substantially straightening the wire feed 120 and/or the wire segment 121 as it passes therethrough.

As illustrated in FIG. 1, in one embodiment, the wire manipulation assembly 135 includes one or more integrated tools 136. Each of the one or more integrated tools 136 includes an integrated wire puller and wire cutter. Alternatively, as illustrated in FIGS. 2-3, the wire manipulation assembly 135 may include one or more wire pullers 137 separate from one or more wire cutters 138. The one or more integrated tools 136 and/or the one or more wire cutters 138 include any suitable device arranged and disposed to cut the wire feed 120 into the wire segments 121. Suitable cutters include, but are not limited to, high energy beam cutters (FIG. 2), mechanical cutters (FIG. 3), computer numerical controlled cutters, or a combination thereof. For example, the wire cutters 138 may include computer numerical controlled high energy beam cutters and/or computer numerical controlled mechanical cutters having, for example, at least two axes, and in one embodiment, up to 5 axes.

Figure 5:
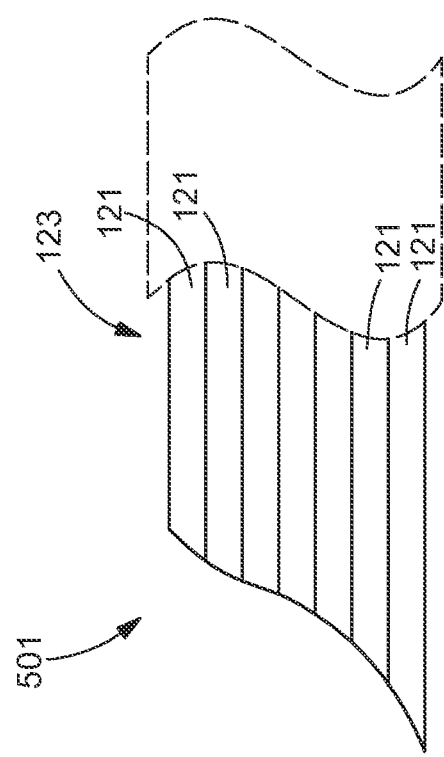
FIG. 5 is an elevational side view of a faceted workpiece stack, according to an embodiment of the disclosure.
Figure 4:
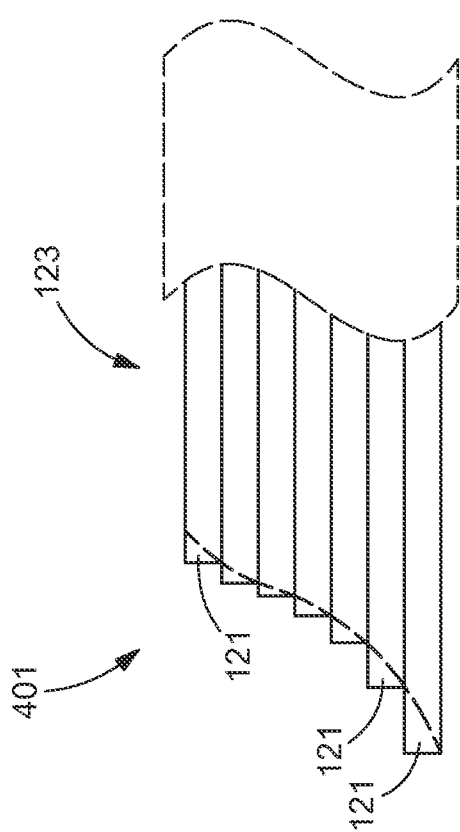
FIG. 4 is an elevational side view of a stepped workpiece stack, according to an embodiment of the disclosure.

Referring to FIGS. 4-5, the wire segments 121 include perpendicularly cut ends, substantially perpendicularly cut ends, angled ends, or a combination thereof. In one embodiment, perpendicularly cut and/or substantially perpendicularly cut ends of the wire segments 121 form a stepped surface 401, as shown in FIG. 4. By perpendicularly cut, it is meant that the wire segments 121 are cut at a 90° angle to the lengthwise direction or direction of wire travel. Likewise, angled ends are ends cut at an angle to the lengthwise direction or direction of wire travel. Referring to FIG. 5, in another embodiment, the angled ends of the wire segments 121 form a facet or continuous surface 501. The continuous surface 501 includes any geometry corresponding to a desired model surface. To form the continuous surface 501, the angled ends may be formed before or after the wire segments 121 are positioned to form the workpiece stack 123. For example, in one embodiment, one or more ends of the wire segments 121 are cut at an angle conforming to an angle of the surface of the intended component geometry. In an alternate embodiment, the stepped surface 401 formed from wire segments 121 having perpendicularly cut or substantially perpendicularly cut ends is machined or otherwise cut to contour the wire segments 121 and form the continuous surface 501. In another alternate embodiment, the stepped surface 401 is remelted by high energy beams to form the continuous surface 501. Any size wire segment 121 may be used to form the workpiece stack 123, with larger wire segments 121 increasing a rate at which the workpiece stack 123 is formed and smaller wire segments 121 providing smoother surfaces and/or increased resolution before a machining of the surface. The size of the wire segment 121 includes, for example, at least about 1 mm, 1 cm or greater.

The workpiece positioner 133 is arranged and disposed to provide multiple axis motion to the workpiece stack 123 during assembly. Suitable workpiece positioners include, but are not limited to, computer numeric control tables, such as a three-axis computer numeric control table, a four-axis computer numeric control table, a five-axis computer numeric control table, or any other computer numeric control table having a sufficient number of axes to provide a desired multiple axis motion to the workpiece stack 123. In one embodiment, the workpiece positioner 133 includes motion software configured to control movement of the workpiece positioner 133. In another embodiment, the workpiece positioner 133 includes multiple and/or adjustable support features for supporting various geometries. In a further embodiment, the multiple axis motion of the workpiece positioner orients the workpiece stack 123 for positioning of the next wire segments 121 and/or aligns the workpiece stack 123 with the energy beam source assembly 139.

Figure 6:
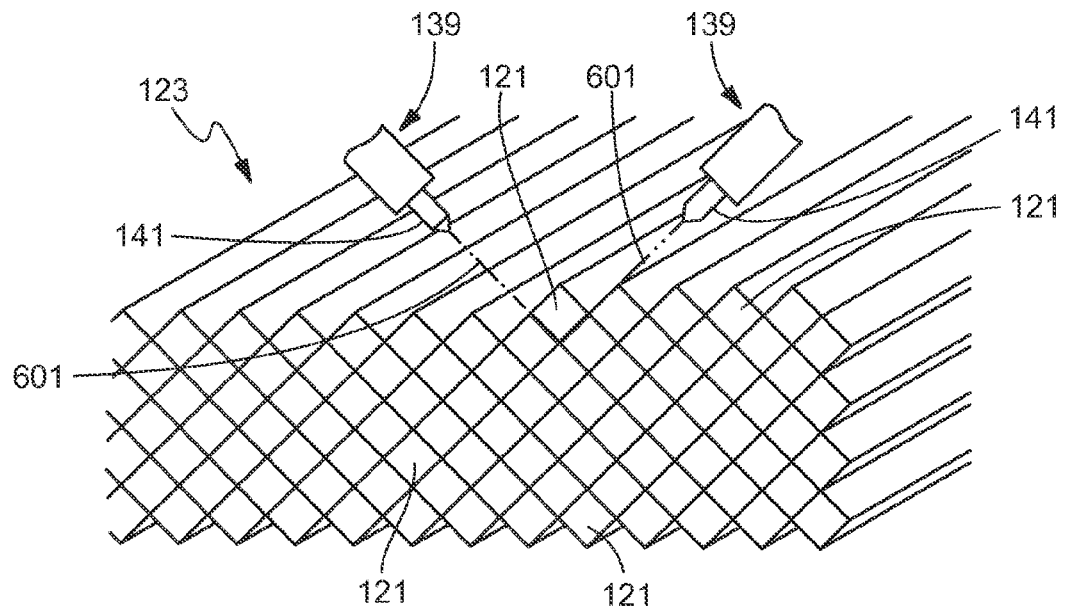
FIG. 6 is a schematic view of a wire segment being welded to the workpiece stack, according to an embodiment of the disclosure.

Referring to FIGS. 1 and 6, the energy beam source assembly 139 is arranged and disposed to direct one or more energy beams 601 toward one or more aligned surfaces of adjacent wire segments 121 within the workpiece stack 123. The energy beam source assembly 139 includes one or more suitable energy beam sources 141, each of the energy beam sources 141 providing one or more of the energy beams 601. Suitable energy beam sources 141 include, but are not limited to, laser sources, electron beam sources, plasma beam sources, or a combination thereof. For example, in one embodiment, the energy beam source assembly 139 includes a single energy beam source 141. The single energy beam source 141 and/or the workpiece stack 123 are moved relative to each other to align the energy beam source 141 with the one or more aligned surfaces of adjacent wire segments 121. In another embodiment, the energy beam source assembly 139 includes a plurality of energy beam sources 141, at least two of the energy beam sources 141 being concurrently aligned with separate aligned surfaces of adjacent wire segments 121, as shown in FIG. 6.

The one or more energy beams 601 penetrate an interface between adjacent wire segments 121 to weld the wire segments 121 together by melting or otherwise fusing at least a portion of the adjacent wire segments 121. In one embodiment, only a portion of the wire segments 121 are melted. Additionally, the one or more energy beams 601 weld the aligned surfaces of adjacent wire segments 121 without changing or substantially changing the geometry of the wire segment 121. Furthermore, in one embodiment, the one or more energy beams 601 weld the wire segments 121 together without filler or molten drops. The welding of the wire segments 121 with the one or more energy beams 601 provides consistent buildup of the wire segments 121, increases buildup speed, and/or increases buildup accuracy. The one or more energy beams 601 also reduce or eliminate voids between the wire segments 121.

Figure 7:
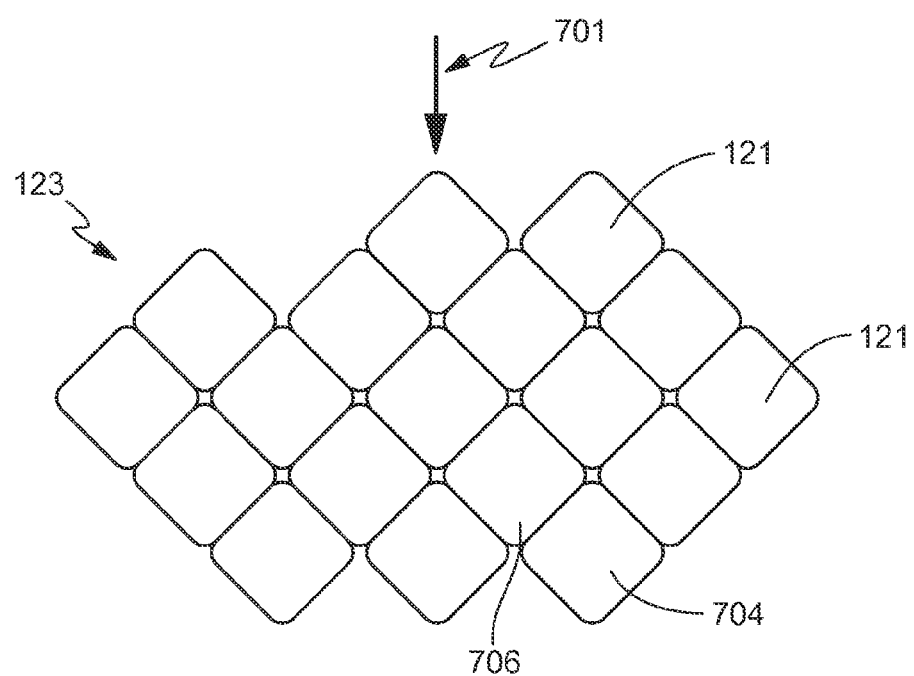
FIG. 7 is an elevational side view of a workpiece stack including rounded square wire segments, according to an embodiment of the disclosure.

Although the wire segments 121 are shown as square segments in FIG. 6, the wire segments 121 may include any other suitable geometry from stacking and welding together. For example, in one embodiment, as illustrated in FIG. 7, the wire segments 121 include a substantially square geometry with rounded corners. In another embodiment, the wire segments 121 including the substantially circular geometry are compressed by a compressive force 701 prior to, during, and/or after directing the one or more energy beams 601 toward the one or more aligned surfaces of the adjacent wire segments 121. The compressive force 701 provides a geometry having surfaces capable of abutting adjacent wire segments 121 and/or provides a force to urge wire segments 121 together to decrease or eliminate voids between the wire segments 121 after welding. Other suitable geometries of the wire segments 121 include, but are not limited to, round, rectangular, triangular, polygonal, or a combination thereof.

Figure 8:
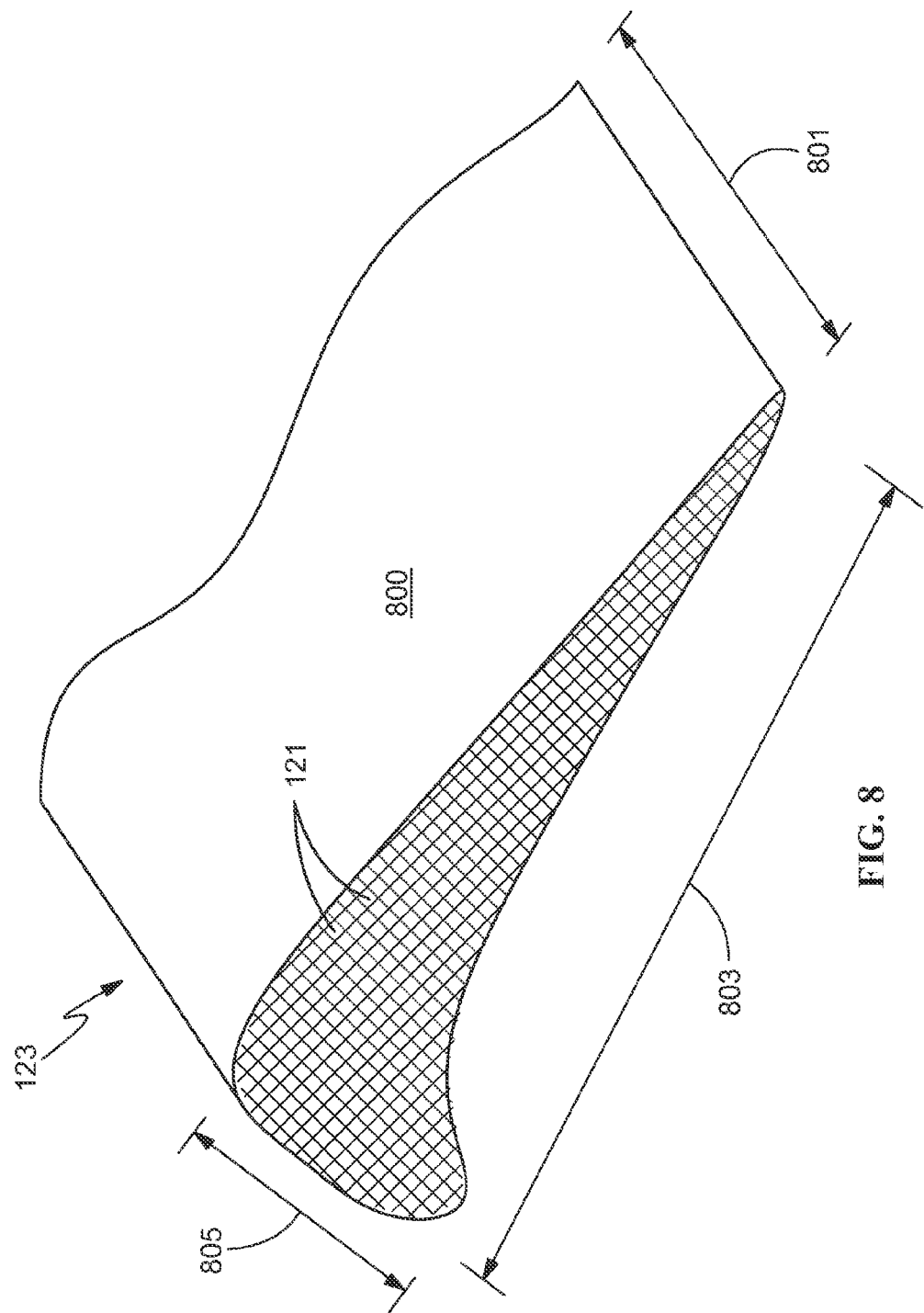
FIG. 8 is a perspective view of a rapid additive manufacturing component, according to an embodiment of the disclosure.

Referring to FIG. 8, a length of each wire segment 121 determines a local length 801 of the workpiece stack 123, the number of wire segments 121 stacked laterally with respect to the workpiece positioner 133 determines a width 803 of the workpiece stack 123, and the number of wire segments 121 stacked vertically with respect to the workpiece positioner 133 determines a height 805 of the workpiece stack 123. By varying the length of the wire segments 121, the number of laterally stacked wire segments 121, and/or the number of vertically stacked wire segments 121, the additive manufacturing system 100 forms the workpiece stack 123 having any desired length 801, width 803, and/or height 805. In one embodiment, the length, positioning, and/or the stacking of the wire segments 121 is provided by computer numeric control based upon a solid model of the workpiece stack 123. In another embodiment, welding the wire segments 121 of the workpiece stack 123 forms a component 800 having the length 801, width 803, and height 805 of the workpiece stack 123. In a further embodiment, the component includes, for example, an airfoil; a turbine bucket, such as, but not limited to, a gas turbine bucket, a steam turbine bucket, a last stage bucket, any other stage bucket; or a combination thereof.

Figure 9:
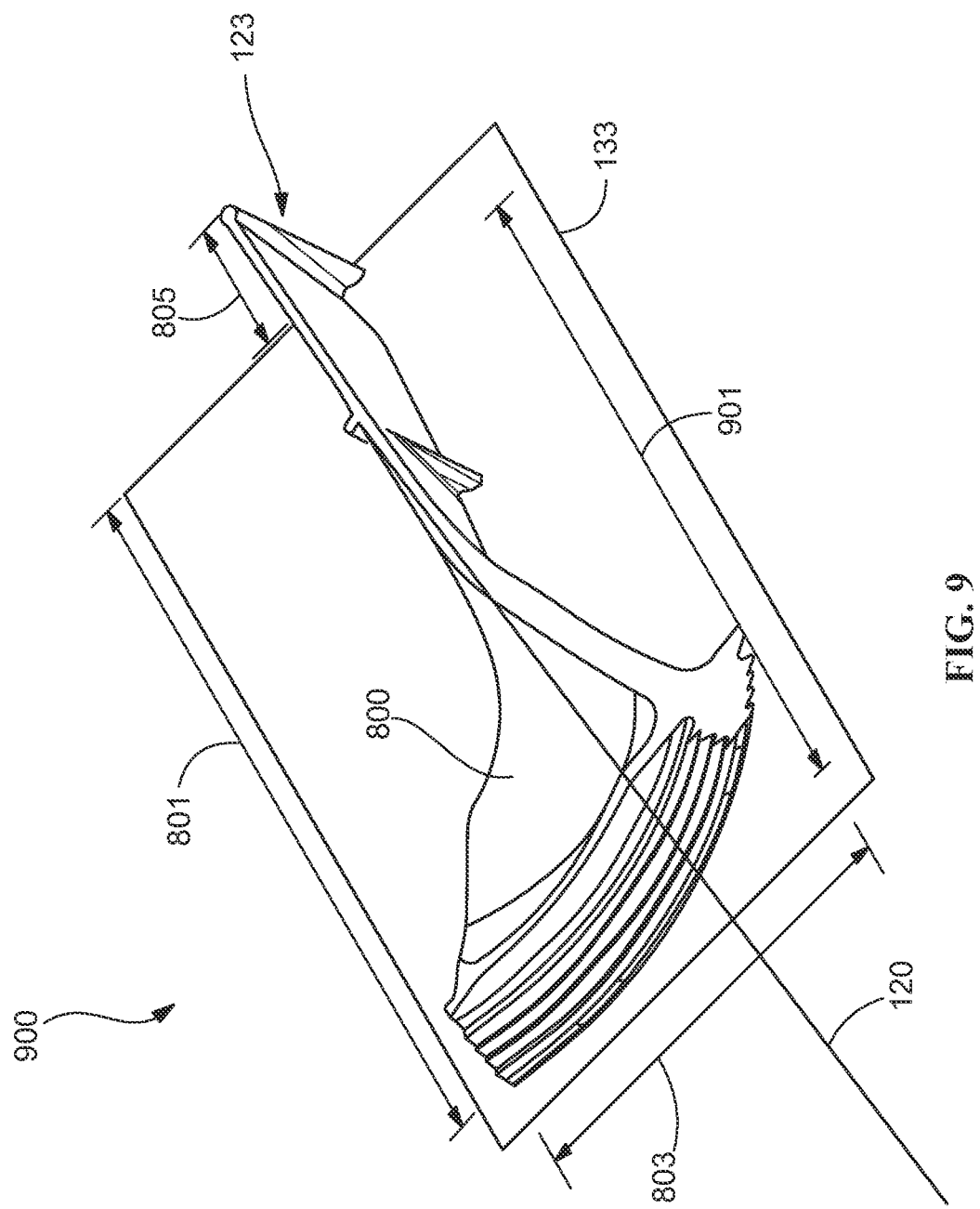
FIG. 9 is a perspective view of a component being formed in a lying position, according to an embodiment of the disclosure.

A component 800, in the form of a turbine bucket, or any other suitable component, may be formed on the workpiece positioner 133 in any suitable orientation, with different orientations corresponding to different arrangements of the workpiece stack 123. For example, as illustrated in FIG. 9, the component 800 is formed on the workpiece positioner 133 in a lying position 900. The lying position 900 includes any position in which a lengthwise direction of the wire segments 121 is aligned parallel or substantially parallel to the longest dimension of the component. For example, in one embodiment, the last stage turbine bucket of a steam turbine is formed in the lying position 900, with the wire segments 121 being aligned parallel or substantially parallel to the length 901 of the component 800. In another embodiment, the length 901 of the component 800 is at least 30 inches, at least 40 inches, at least 50 inches, greater than 50 inches, or any combination, sub-combination, range, or sub-range thereof. The forming of components 800 in the lying position 900 permits positioning longer wire segments 121, which decreases a frequency of wire switchover and/or decreases a buildup time for the component 800. In another embodiment, when formed in the lying position 900, the wire segments 121 are parallel or substantially parallel to a radial axis of the component 800, which aligns or substantially aligns the wire segments 121 with the radial pull direction, increasing radial pull load strength of the component 800.

Figure 10:
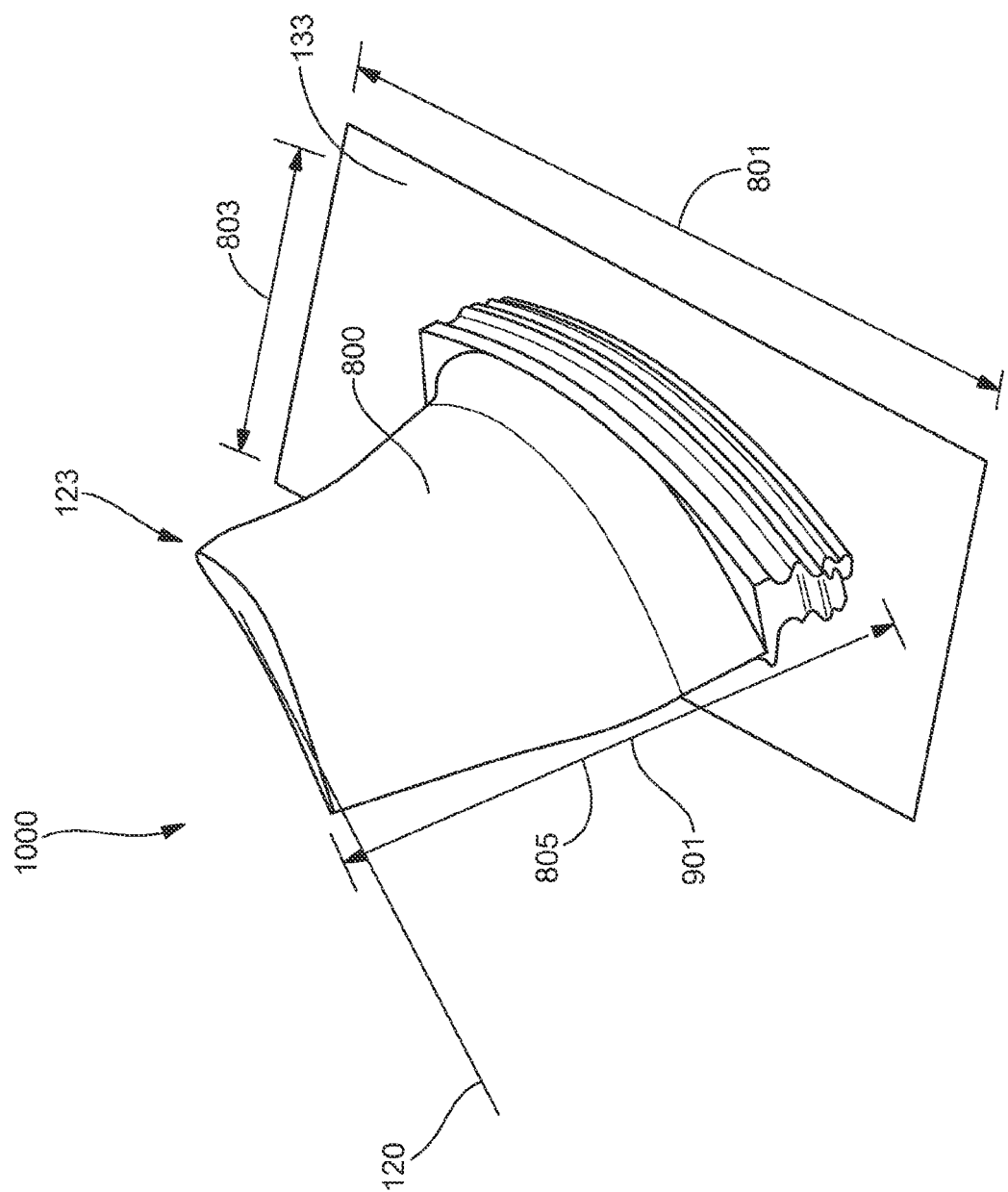
FIG. 10 is a perspective view of a component being formed in a standing position, according to an embodiment of the disclosure.

Alternatively, as illustrated in FIG. 10, the component 800 is formed on the workpiece positioner 133 in a standing position 1000. The standing position 1000 includes any position in which the lengthwise direction of the wires segments 121 is perpendicular or substantially perpendicular to the longest dimension of the component. For example, in one embodiment, the component 800 is a last stage turbine bucket formed in the standing position 1000, with the wire segments 121 being perpendicular or substantially perpendicular to the length 901 of the component 800. In another embodiment, forming the component 800 in the standing position 1000 provides a dovetail base which increases stability of the workpiece stack 123 during buildup. In a further embodiment, the stacking surface of the workpiece stack 123 is continuous, which decrease stacking complexity during buildup. Additionally, when formed in the standing position 1000, a single wire section may be applied in one stacking cycle, which decreases a stacking complexity during buildup.

Figure 11:
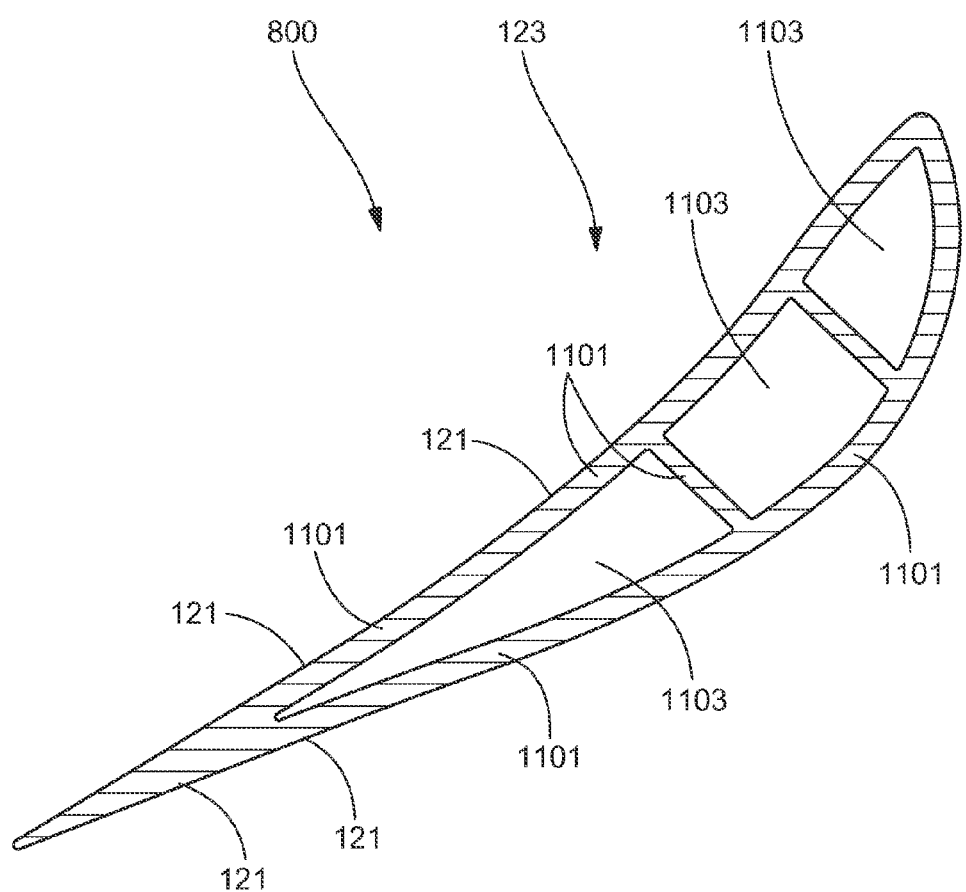
FIG. 11 is a section view of a turbine bucket, according to an embodiment of the disclosure.

Referring to FIG. 11, in one embodiment, the component formed by the additive manufacturing system 100 includes a component 800 in the form of a hollow last stage bucket. In another embodiment, one or more of the wire segments 121 is split into two or more sections 1101. The sections 1101 of each wire segment 121 are positioned on the same plane and the same line of the workpiece stack 123, with an open space between each section 1101 of the wire segment 121. The open space between the sections 1101 of each wire segment 121 may be varied to form any suitable feature within the component. For example, as illustrated in FIG. 11, the features may include one or more cavities 1103 or chambers within the component 800.

In one embodiment, an additive manufacturing method for fabricating a component includes providing a first wire segment 704 and a second wire segment 706 (see FIG. 7), the first wire segment 704 and the second wire segment 706 each having a cross-sectional stackable geometry. In another embodiment, the providing of the first wire segment 704 and the second wire segment 706 includes cutting the wire feed 120 into the first wire segment 704 and the second wire segment 706. In a further embodiment, the first wire segment 704 and/or the second wire segment 706 are cold drawn wire. The additive manufacturing method also includes positioning the first wire segment 704 into an alignment with the second wire segment 706 to form the workpiece stack 123. The positioning of the first wire segment 704 may further include providing a plurality of alignments with one or more additional wire segments 121. The alignment of the first wire segment 704 aligns adjacent surfaces in a line of sight direction. By line of sight direction, it is meant that the adjacent surfaces of wire segments 121 are sufficiently aligned to permit welding or fusing along those surfaces by energy beams directed toward the area where adjacent surfaces abut. The additive manufacturing method then includes directing the energy beam 601 (see FIG. 6) toward the first wire segment 704 and the second wire segment 706 along the alignment to weld the first wire segment 704 to the second wire segment 706 to form a welded stack. In one embodiment, the directing of the energy beam 601 includes directing a plurality of energy beams 601 simultaneously to the first wire segment 704, the second wire segment 706, and/or any additional wire segments 121. In a further embodiment, one or more of the plurality of energy beams 601 may be directed at an increased angle to provide clearance between the energy beam 601 and a non-abutting surface of one of the wire segments 121.

Figure 12:
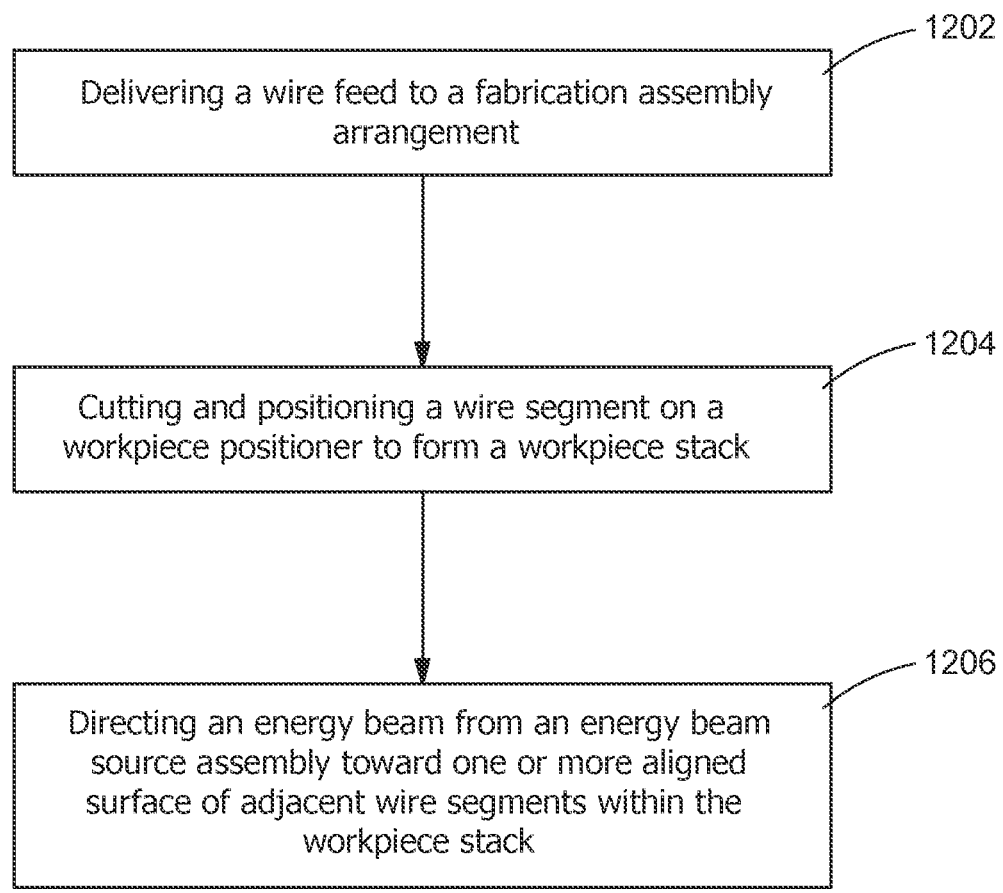
FIG. 12 is a flow chart of a rapid additive manufacturing fabrication method, according to an embodiment of the disclosure.

Referring to FIG. 12, in another embodiment, a method 1200 for fabricating a component includes delivering the wire feed 120 to the fabrication assembly arrangement 130 (step 1202) with the wire delivery assembly 110. For example, the wire feed 120 may be unwound from the reel 111 by the pickup and break roller 113, the delivery roller 131, and/or supported by the wire delivery assembly 110 while being pulled by the wire manipulation assembly 135. During the delivering of the wire feed 120, the orientation device 117 of the wire delivery assembly 110 may orient the wire feed 120 in a predetermined direction, the predetermined direction corresponding to the stack configuration and alignment of wire surfaces for subsequent welding.

The method 1200 also includes cutting and positioning the wire segment 121 on the workpiece positioner 133 to form the workpiece stack 123 (step 1204). The positioning of the wire segment 121 includes clamping the wire feed 120 at an exit of the delivery roller 131 with the integral tool 136 or the wire puller 137 of the wire manipulation assembly 135, then pulling the wire feed 120 to a desired position (e.g., a position according to a model of the workpiece stack 123). One or more additional integral tools 136 and/or wire pullers 137 then clamps the wire feed 120 at the exit of the delivery roller 131, forming the wire segment 121 between the clamped portions of the wire feed 120. In one embodiment, the workpiece positioner 133 moves in the X, Y, and Z axes to position the workpiece stack 123 relative to the wire segment 121, then moves the workpiece stack 123 into contact with the wire segment 121 clamped by the wire manipulation assembly 135.

Figure 13:
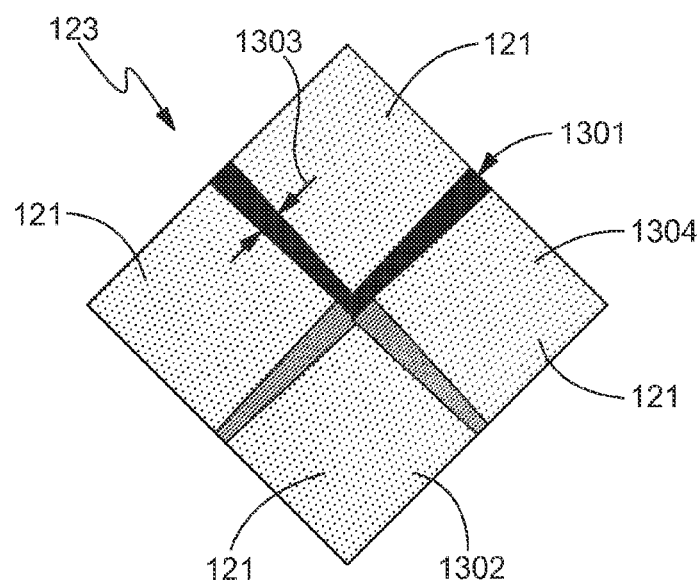
FIG. 13 is a section view of a workpiece stack, according to an embodiment of the disclosure.

After positioning the workpiece stack 123 in contact with the wire segment 121, the method 1200 includes directing the energy beam 601 from the energy beam source assembly 139 toward one or more aligned surfaces of adjacent wire segments 121 within the workpiece stack 123 (step 1206); and cutting the ends of the wire segment 121 with the wire manipulation assembly 135. Alternatively, the wire feed 120 may be cut prior to positioning the workpiece stack 123 in contact with the wire segment 121, then the wire segment 121 is positioned on the workpiece positioner 133 and/or the workpiece stack 123 by relative movement of the wire manipulation assembly 135 and/or the workpiece positioner 133. Referring to FIG. 13, the directing of the energy beam 601 (step 1206) welds the wire segments 121 with a small bead 1301 and/or a narrow heat affected zone 1303. The small bead 1301 and/or the narrow heat affected zone 1303 reduce or eliminate thermal stress and/or distortion in the workpiece stack 123. Additionally, in one embodiment, the directing of the energy beam 601 (see FIG. 6) provides welding of the wire segments 121 without a welding filler.

In one embodiment, one or more computer numerical control (CNC) controllers provide control of the wire delivery system 110, the workpiece positioner 133, the wire manipulation assembly 135, and/or the energy beam source assembly 139. For example, in another embodiment, the CNC controller(s) direct movement of the workpiece positioner 133 and/or the energy beam source assembly 139, the movement determining a welding length during the directing of the energy beam 601 (step 1206). In a further embodiment, the CNC controller(s) direct movement of the wire feed 120 through the wire delivery system 110, movement of the workpiece positioner 133, and/or movement of the wire manipulation assembly 135, the movement providing wire segment 121 positioning, orientation, and/or length according to a desired geometry of the component 800 during the positioning and cutting of the wire segment 121 (step 1204).

After directing the energy beam 601 (step 1206) and/or cutting the wire segment 121, the workpiece positioner 133, the wire manipulation assembly 135, and/or the energy beam source assembly 139 are repositioned. The repositioning includes, but is not limited to, moving the workpiece positioner 133 to provide clearance between the wire manipulation assembly 135 and the workpiece stack 123; positioning the wire manipulation assembly 135 to clamp the wire feed 120; positioning the energy beam source assembly 139 to direct the one or more energy beams 601 at the next wire segment 121; or a combination thereof. Steps 1202, 1204, and/or 1206 are then repeated to form the workpiece stack 123 in accordance with the desired length 801, width 803, and/or height 805 of the component 800.

During and/or after welding all of the wire segments 121 in the workpiece stack 123, the method 1200 optionally includes machining the surface of the welded stack with a mechanical machining device, a high energy beam, or a combination thereof. The machining of the surface provides a desired surface finish and/or geometry of the component. In one embodiment, the delivery of the wire feed 120 (step 1202), the cutting and positioning of the wire segment 121 (step 1204), the directing of the energy beam 601 (step 1206), and/or the repositioning of the fabrication assembly arrangement 130 is directed by a rapid additive manufacturing control program, which forms a predetermined geometry of the workpiece stack 123.

Rapid additive manufacturing according to the method 1200 disclosed herein increases a manufacturing rate, reduces prototyping cycle time, reduces prototyping cost, or a combination thereof. For example, in one embodiment, rapid additive manufacturing increases the manufacturing rate by over ten times current three-dimensional printing methods, and by over five times current large forging methods. In another embodiment, the rapid additive manufacturing provides manufacturing at rates of, for example, over 40 lbs/hr, over 100 lbs/hr, over 150 lbs/hr, between 40 and 200 lbs/hr, or any combination, sub-combination, range, or sub-range thereof. Additionally, rapid additive manufacturing according to the method 1200 disclosed herein provides volume production without tooling such as forging dies and/or casting mold.

Figure 14:
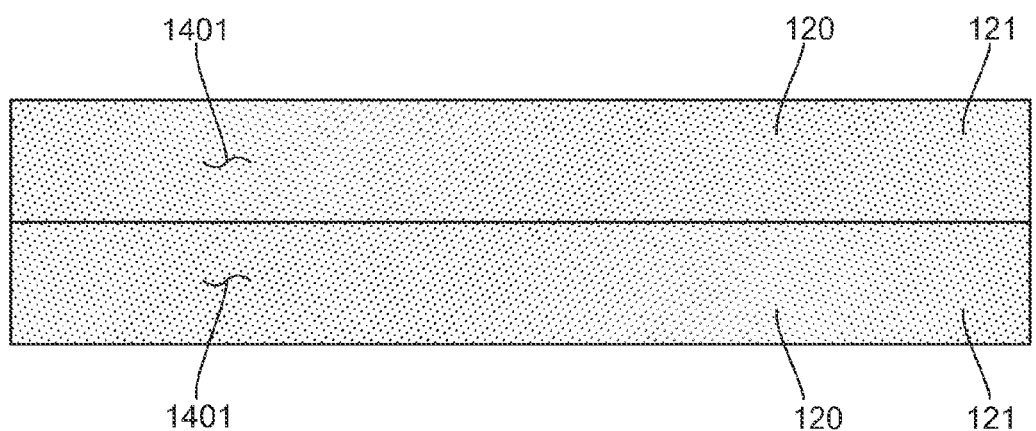
FIG. 14 is a section view a wire segment taken in a lengthwise direction, according to an embodiment of the disclosure.

In one embodiment, an incremental cooling of the wire segments 121 during the method 1200 reduces or eliminates coarse grains formed during forging and/or casting. In another embodiment, the incremental cooling reduces or eliminates global stress in the component. In a further embodiment, the wire segments 121 are cold drawn forming a cold drawn material microstructure 1401. As illustrated in FIG. 14, the cold drawn material microstructure 1401 includes, but is not limited to, a refined fibrous grain, a stretched fibrous grain, a grain including compression stress, reduced grain size as compared to hot forging, or a combination thereof. The cold drawn material microstructure 1401 of the wire segments 121 increases strength, increases hardness, increases toughness, increases fatigue resistance, or a combination thereof.

Figure 15:
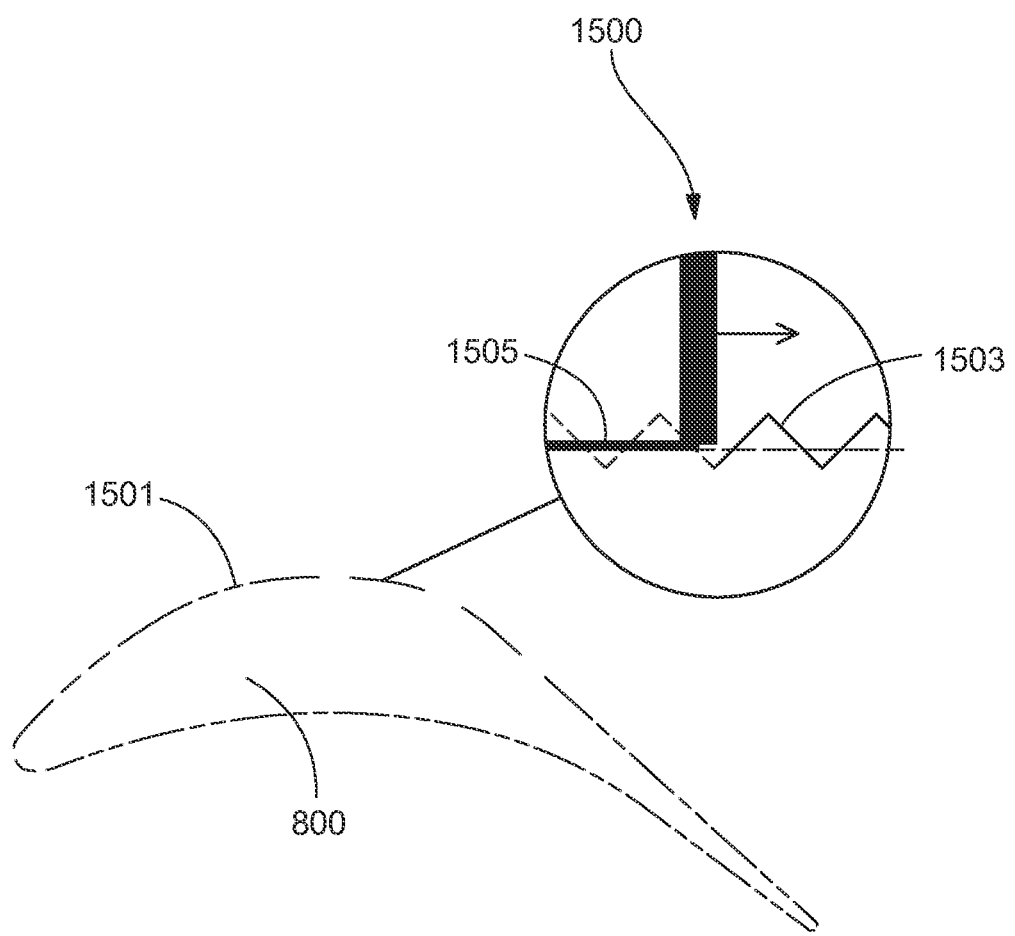
FIG. 15 is a schematic view of a surface treatment process, according to an embodiment of the disclosure.

Referring to FIG. 15, in one embodiment, the method 1200 includes a surface treatment after formation of the workpiece stack and/or component 800. In one embodiment, the method 1200 includes other surface treatments such as, but not limited to, laser remelting 1500, machining, electrical discharge machining, electrochemical machining, or a combination thereof. For example, as shown in FIG. 15, laser remelting 1500 includes directing an energy beam along a surface 1501 of the component, which reduces or eliminates surface irregularities 1503 and forms a planar surface 1505. The planar surface 1505 having an increased smoothness as compared to the surface 1501 prior to the laser remelting 1500.

In another embodiment, a post heat treatment includes a heat treatment, such as annealing. Annealing reduces or eliminates welding stresses formed during the fabrication of the component or residually present in the component 800. Other suitable heat treatment steps include solution heat treatment, tempering, aging, combinations thereof, and any other heat treatment that is capable of providing the desired component properties.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An additive manufacturing system:
a wire delivery assembly arranged and disposed to deliver a wire feed to a fabrication assembly arrangement;
the fabrication assembly arrangement includes a wire manipulation assembly, the wire manipulation assembly being arranged and disposed to convert the wire feed into a wire segment and position the wire segment on a workpiece positioner to form a workpiece stack, the workpiece positioner being arranged and disposed to provide multiple axis motion to the workpiece stack during assembly;
an energy beam source assembly arranged and disposed to direct one or more energy beams toward one or more aligned surfaces of adjacent wire segments within the workpiece stack, to weld the wire segments together,
wherein the wire delivery assembly includes an orientation device arranged and disposed to align one or more surfaces of the wire segment in a predetermined direction, and
wherein the orientation device includes one or more straightening rollers.

2. The additive manufacturing system of claim 1, wherein the wire manipulation assembly includes a wire puller and a wire cutter.

3. The additive manufacturing system of claim 1, wherein the wire manipulation assembly includes a plurality of wire pullers and wire cutters.

4. The additive manufacturing system of claim 1, wherein the wire manipulation assembly includes an integrated tool having an integrated wire puller and wire cutter.

5. The additive manufacturing system of claim 1, wherein the wire manipulation assembly includes a wire cutter arranged and disposed to cut the wire segments with angled ends.

6. The additive manufacturing system of claim 1, wherein the wire manipulation assembly includes a high energy beam cutter for cutting the wire feed into the wire segments.

7. The additive manufacturing system of claim 1, wherein the workpiece positioner is a 4-axis computer numeric control table.

8. The additive manufacturing system of claim 1, wherein the workpiece positioner is a 5-axis computer numeric control table.

9. The additive manufacturing system of claim 1, wherein the energy beam source assembly includes a plurality of energy beam sources.

10. The additive manufacturing system of claim 1, wherein the energy beam source assembly includes a laser source.

11. The additive manufacturing system of claim 1, wherein the energy beam source assembly includes an electron beam source.

12. An additive manufacturing system:
a wire delivery assembly arranged and disposed to deliver a wire feed to a fabrication assembly arrangement;
the fabrication assembly arrangement includes a wire manipulation assembly, the wire manipulation assembly being arranged and disposed to convert the wire feed into a wire segment and position the wire segment on a workpiece positioner to form a workpiece stack, the workpiece positioner being arranged and disposed to provide multiple axis motion to the workpiece stack during assembly;
an energy beam source assembly arranged and disposed to direct one or more energy beams toward one or more aligned surfaces of adjacent wire segments within the workpiece stack, to weld the wire segments together,
wherein the wire manipulation assembly includes a wire puller and a wire cutter.

13. The additive manufacturing system of claim 12, wherein the wire manipulation assembly includes a plurality of wire pullers and wire cutters.

14. The additive manufacturing system of claim 12, wherein the wire manipulation assembly includes an integrated tool having an integrated wire puller and wire cutter.

15. The additive manufacturing system of claim 12, wherein the wire manipulation assembly includes a wire cutter arranged and disposed to cut the wire segments with angled ends.

16. The additive manufacturing system of claim 12, wherein the wire manipulation assembly includes a high energy beam cutter for cutting the wire feed into the wire segments.

17. The additive manufacturing system of claim 12, wherein the workpiece positioner is a 4-axis or 5-axis computer numeric control table.

18. The additive manufacturing system of claim 12, wherein the energy beam source assembly includes a plurality of energy beam sources.

19. The additive manufacturing system of claim 12, wherein the energy beam source assembly includes a laser source.

20. The additive manufacturing system of claim 12, wherein the energy beam source assembly includes an electron beam source.

\* \* \* \* \*